United States Patent [11] 3,627,892

[72] Inventor Hermann Moor
 Binningen, Switzerland
[21] Appl. No. 722,182
[22] Filed Apr. 18, 1968
[45] Patented Dec. 14, 1971
[73] Assignee Chemoforma A.G.
 Muenchenstein, Basel-Landschaft,
 Switzerland
[32] Priority Apr. 19, 1967
[33] Great Britain
[31] 18,101/67

[54] GROWTH RATE OF ANIMALS WITH A THIOURACIL-CARBOXYLIC ACID
3 Claims, No Drawings

[52] U.S. Cl. .................................................. 424/251
[51] Int. Cl. ...................................................... A61k 27/00
[50] Field of Search .......................................... 424/251

[56] References Cited
OTHER REFERENCES
Carrara et al., Chem. Abst. Vol. 53, 1959, page 7432d Primary Examiner—Sam Rosen
Attorney—Bacon & Thomas ABSTRACT: A method of improving the growth rate of pigs, poultry, fowl, and fur-bearing animals, comprising orally administering to these animals 2-thiouracil-4-carboxylic acid or a nontoxic salt or lower alkyl ester thereof; or this acid, salt or ester together with either methionine or uracil-4-carboxylic acid or a nontoxic salt or lower alkyl ester thereof.

GROWTH RATE OF ANIMALS WITH A THIOURACIL-CARBOXYLIC ACID

BACKGROUND

This invention relates to veterinary compositions for the treatment of animals such as for example farm animals (e.g., pigs, poultry, fowl, cattle and sheep) and fur-bearing animals e.g., minks, chinchillas and the like). The term "veterinary composition" is used herein to include nutritional compositions containing an active ingredient as hereinafter defined.

SUMMARY OF THE INVENTION

The present invention is based upon the discovery that the growth rate of farm animals such as for example pigs, poultry, fowl, cattle and sheep and also the fur-bearing qualities of animals such as minks and chinchillas can be significantly improved by the administration of a thiouracil-carboxylic acid, preferably 2-thiouracil-4-carboxylic acid which is the compound of the formula

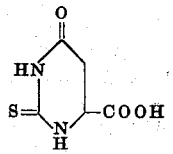

The advantages to be gained by administration of thiouracil-carboxylic acids to for example farm animals are not confined to an improvement in growth rate. In the case of pigs and particularly mother sows the administration of thiouracil-carboxylic acids not only improves growth rate but also develops an activity against piglet's grippe. The thiouracil-carboxylic acids may be thus fed to mother sows to provide a degree of immunity in the piglets which they produce. The piglets thus produced also in general remain free from piglet's anemia. In poultry and fowl, the administration of thiouracil-carboxylic acids generally improves egg production and prolongs the laying period. Generally in mammals including fur-bearing animals the administration of thiouracil-carboxylic acid causes an increase in fertility. With fur-bearing animals, the administration of thiouracil-carboxylic acids generally results in the production of skins which are more compact and/or have improved brightness.

According to one feature of the present invention, there is provided a veterinary composition which comprises, as active ingredient, a thiouracil-carboxylic acid or a nontoxic salt or alkyl ester of a thiouracil-carboxylic acid, together with one or more suitable carriers as herein defined, the composition containing from 0.1 to 1,000 parts by weight of the said active ingredient per million parts by weight of the composition.

The thiouracil-carboxylic acids used in the veterinary compositions according to the invention are preferably 2-thiouracil-carboxylic acids. 2-thiouracil-4-carboxylic acid and salts and alkyl esters thereof are the preferred active ingredients.

By the term "nontoxic" as used herein in relation to the salts of thiouracil-carboxylic acids we mean such salts the cationic portions of which are physiologically compatible in the dosages used. Preferred salts include alkali metal salts such as sodium and potassium salts, and ammonium and quaternary ammonium salts such as for example the choline salt. Preferred alkyl esters are esters in which the alkyl group is a lower alkyl group containing from one to five carbon atoms, especially a methyl or ethyl group.

The term "suitable carrier" as used herein means any solid or liquid carrier suitable for the formulation of veterinary compositions. The term does nor include water or solvents alone which together with the other component or components of the composition in the concentrations in which they are present give rise to mere known solutions.

The carrier may be liquid or solid and may be or may not have nutrient properties. In one convenient form or composition, the active ingredient is incorporated into an edible feedstuff in such an amount as will provide a sufficient daily minimum intake thereof to give the desired effect, this amount generally being not less than 0.1 parts by weight per million parts of weight of the edible feedstuff. The edible feedstuff used of course depend upon the particular animal to be treated. One preferred veterinary composition in accordance with the present invention comprises a feedstuff particularly adapted for consumption by pigs together with the thiouracil-carboxylic acid or salt or ester thereof in the concentrations hereinabove specified. The veterinary composition according to the invention may also comprise an active ingredient in a liquid carrier, and a suitable carrier comprises water which may also contain emulsifiers, dispersants, wetting agents or the like which facilitate the dissolution or homogenous suspension of the active ingredient therein.

The veterinary compositions according to the invention preferably contain at least 1 part by weight, advantageously from 1 to 50 parts by weight, of active ingredient per million parts by weight of the composition.

It is often convenient to prepare a concentrate containing a high proportion of the active ingredient, and the invention therefore provides a modification of the veterinary compositions according to the invention as hereinbefore defined which is in the form of a concentrate or food premix adapted to be added to an animal feedstuff or to drinking water and which comprises a thiouracil-carboxylic acid or salt or alkyl ester thereof as active ingredient together with a suitable carrier. The compositions may be liquid, e.g., in the form of a drop solution for adding to drinking water, or solid, e.g., in a form suitable for adding to solid feedstuffs. Concentrates or food premixes preferably contain from 5 mg. to 10 g., preferably from 0.3 to 5 g. of thiouracil-carboxylic acid per kg. concentrate.

As explained above, thiouracil-carboxylic acids are particularly useful for administration to pigs as they not only improve the growth rate but also provide a useful activity against certain diseases.

According to a further feature of the present invention, there is thus provided a method of improving the growth rate of pigs and/or providing a degree of activity against diseases such as piglet's grippe which comprises administering a thiouracil-carboxylic acid (or a nontoxic salt or alkyl ester thereof) to pigs, Where activity against for example piglets grippe is desired, the thiouracil-carboxylic acid is preferably fed to mother sows so that piglets produced by the sows have the desired activity. Administration is conveniently by the oral route.

The administration of thiouracil-carboxylic acids to poultry and fowl is useful in the prevention of avian leukosis, and thus according to a yet further feature of the present invention there is provided a method of improving the growth rate of poultry and fowl and/or combatting avian diseases (especially avian leukosis) which comprises administering a thiouracil-carboxylic acid (or a nontoxic salt or alkyl ester thereof) to marketable poultry or fowl. Again administration is conveniently by the oral route.

The administration of thiouracil-carboxylic acids to fur-bearing animals results in furs of improved quality, and, according to a yet further feature of the present invention there is provided a method of improving the growth rate and/or improving the quality of the furs of fur-bearing animals which comprises administering a thiouracil-carboxylic acid (or a nontoxic salt or alkyl ester thereof) thereto.

It has further been found that improved results can be obtained if the thiouracil-carboxylic acid is administered to animals together with methionine or a biological equivalent thereof such as for example hydroxy-methionine or methoxy-methionine.

It is thus advantageous to include in the veterinary compositions according to the invention a proportion of methionine or a biological equivalent thereof. It has been found that instead of methionine or derivatives thereof one can use other biological methylating agents, that is agents capable of effecting the introduction of methyl agents may for example be physiological methyl donors, and methionine, hydroxy-methionine and methoxy-methionine are of course well-known methyl donors. Other such donors include choline and 5-methyl-tetrahydrofolic acid. In general, methyl donors possess a comparatively labile methyl group. Such a methyl group will generally be attached to a sulfur atom (as in methionine) or a nitrogen atom (as in choline).

Preferred veterinary compositions according to the invention contain methionine or other biological methylating agent, the ration by weight of the thiouracil-carboxylic acid (or nontoxic salt or alkyl ester thereof) to methionine or other biological methylating agent being from 1:10 to 1:200, advantageously about 1:100, by weight.

It has also been found that improved results can be obtained if the thiouracil-carboxylic acid component is administered to animals together with a uracil-carboxylic acid or a nontoxic salt or alkyl ester thereof. The uracil-carboxylic acid is preferably uracil-4-carboxylic acid but may also be for example be provided by uracil-5-carboxylic acid, esters of such acids. Thus preferred veterinary compositions according to the invention contain a uracil-carboxylic acid, the particularly preferred ratio by weight of the thiouracil-carboxylic acid (or nontoxic salt or alkyl ester thereof) to uracil-carboxylic acid (or nontoxic salt or alkyl ester thereof) being from 1:1 to 1:50, preferably about 1:10, by weight.

According to a yet further feature of the present invention, there is thus provided a veterinary composition which comprises a thiouracil-carboxylic acid, or a nontoxic salt or alkyl ester of a thiouracil-carboxylic acid, together with methionine (or other biological methylating agent) and/or a uracil-carboxylic acid (or a nontoxic salt of alkyl or alkyl ester thereof).

The thiouracil-carboxylic acid (or nontoxic salt or alkyl ester thereof) is preferably administered at a dose of from 10 mg. to 450 mg. per kg. body weight, a particularly preferred dose being from 200 mg. to 3 mg. per kg. body weight. When administered together with a uracil-carboxylic acid or nontoxic salt or alkyl ester thereof), the latter is preferably administered at a dosage of from 1 to 5 mg./kg. body weight. When administered together with methionine (or a biological equivalent thereof), the latter is preferably administered at a dosage of from 10 to 50 mg./kg. body weight.

The following examples illustrates veterinary compositions according to the invention:

EXAMPLE 1

Pig Food
  Ingredients
    5 g. 2-thiouracil-4-carboxylic acid sodium salt
    50 g. uracil-4-carboxylic acid sodium salt
    500 g. dl-methionine
The ingredients are homogeneously mixed with 445 g. dried skim milk. The concentrate thus obtained is homogeneously mixed with 1,000 kg. of piglet's dry food.

EXAMPLE 2

Pig Food
  Ingredients
    6 g. 2-thiouracil-4-carboxylic acid
    30 g. uracil-4-carboxylic acid
    600 g. dl-methionine
The ingredients are homogeneously mixed with 150 g. ferrous sulfate and 214 g. maize or wheatmeal. 1 kg. of this premix are then mixed with 1,000 kg. mash for mother sows.

EXAMPLE 3

Drinking Water For Poultry
  Ingredients
    80 mg. of the choline salt of 2-thiouracil-4-carboxylic acid
    300 mg. of the choline salt of uracil-4-carboxylic acid
    2 g. dl-methionine
The ingredients are dissolved in 100 ml. water. The drop solution thus obtained is added in a ratio of 1:100 by weight to drinking water for poultry.

EXAMPLE 4

Poultry Food
    10 g. 2-thiouracil-4-carboxylic acid
    20 g. uracil-4-carboxylic acid
The ingredients are mixed and then homogeneously dispersed in 970 g. protein hydrolysate. 2 kg. of this premix are mixed in 1,000 kg. mash for breeding hens.

EXAMPLE 5

Milk
  Ingredients
    100 mg. 2-thiouracil-4-carboxylic acid
The active ingredient is mixed in 1 kg. dried skim milk. 100 g. of the premix thus obtained is dissolved in 1 liter water to provide a milk for administration to animals.

I claim:
1. A method of improving the growth rate of pigs, which comprises orally administering to pigs for this purpose of an effective amount of
   a. 2-thiouracil-4-carboxylic acid or a nontoxic salt or lower alkyl ester thereof, or
   b. said acid, salt, or ester together with methionine or uracil-4-carboxylic acid or a nontoxic salt or lower alkyl ester thereof.

2. A method of improving the growth rate of poultry and fowl, which comprises orally administering to poultry or fowl for this purpose an effective amount of
   a. 2-thiouracil-4-carboxylic acid or a nontoxic salt or lower alkyl ester thereof, or
   b. said acid, salt, or ester together with methionine or uracil-4-carboxylic acid or a nontoxic salt or lower ester thereof.

3. A method of improving the growth rate and the quality of fur produced by fur-bearing animals, which comprises orally administering to said animals for this purpose an effective amount of
   a. 2-thiouracil-4-carboxylic acid or a nontoxic salt or lower alkyl ester thereof, or
   b. said acid, salt, or ester together with methionine or uracil-4-carboxylic acid or a nontoxic salt or lower alkyl ester thereof.

* * * * *